United States Patent

Morris et al.

(12) United States Patent
(10) Patent No.: US 7,401,838 B2
(45) Date of Patent: Jul. 22, 2008

(54) RECONFIGURABLE SUN VISOR

(75) Inventors: Steven E. Morris, Fair Haven, MI (US); Janet S. Goings, Commerce Township, MI (US); Adrian B. Chernoff, Boulder, CO (US)

(73) Assignee: GM Global TEchnology Operations, Inc., Detroit, MI (US)

( * ) Notice: Subject to any disclaimer, the term of this patent is extended or adjusted under 35 U.S.C. 154(b) by 116 days.

(21) Appl. No.: 11/332,945

(22) Filed: Jan. 17, 2006

(65) Prior Publication Data

US 2007/0176459 A1   Aug. 2, 2007

(51) Int. Cl.
 *B60J 3/00* (2006.01)
(52) U.S. Cl. .................... 296/97.9; 296/97.1; 296/97.5; 296/97.6
(58) Field of Classification Search ................ 296/97.1, 296/97.5, 97.6, 97.9, 97.11; 160/DIG. 3; 224/312
See application file for complete search history.

(56) References Cited

U.S. PATENT DOCUMENTS

| | | | |
|---|---|---|---|
| 2,486,096 A | 10/1949 | Axford | |
| 2,547,101 A | 4/1951 | Uttz | |
| 2,655,299 A | 10/1953 | Pfeiffer et al. | |
| 2,673,670 A | 3/1954 | Steele | |
| 2,707,072 A | 4/1955 | Sims | |
| 3,016,262 A | 1/1962 | Hunt | |
| 3,140,781 A | 7/1964 | Rothgart | |
| 4,275,916 A | 6/1981 | Skogler | |
| 4,364,598 A * | 12/1982 | Viertel | 296/97.9 |
| 4,781,409 A | 11/1988 | Harbison | |
| 4,844,311 A | 7/1989 | Kalen | |
| 5,195,668 A | 3/1993 | Kunes et al. | |
| 5,301,856 A | 4/1994 | Newsome | |
| 5,329,947 A | 7/1994 | Shilker | |
| 5,374,097 A * | 12/1994 | George et al. | 296/97.5 |
| 5,379,929 A | 1/1995 | Eskandry | |
| 5,490,708 A | 2/1996 | Lee | |
| 5,516,018 A | 5/1996 | Eskandry | |
| 5,611,590 A | 3/1997 | Filgueiras | |
| 5,662,370 A * | 9/1997 | Kassner | 296/97.6 |
| 5,678,880 A * | 10/1997 | Keller | 296/97.6 |
| 5,772,272 A | 6/1998 | Faddis | |
| 5,785,222 A | 7/1998 | Basso et al. | |
| 5,882,059 A | 3/1999 | Romero | |
| 5,887,773 A | 3/1999 | Booth | |
| 6,543,832 B1 * | 4/2003 | Bogdanski et al. | 296/97.1 |
| 6,637,799 B1 * | 10/2003 | Tiesler | 296/97.1 |
| 6,890,017 B2 * | 5/2005 | Herbst et al. | 296/97.1 |
| 2002/0038959 A1 * | 4/2002 | Francis et al. | 296/97.6 |
| 2003/0160473 A1 * | 8/2003 | Tiesler | 296/97.1 |
| 2003/0160474 A1 * | 8/2003 | Palmer et al. | 296/97.5 |
| 2004/0011835 A1 * | 1/2004 | Kim | 224/312 |
| 2004/0094588 A1 | 5/2004 | Klein | |
| 2006/0103173 A1 * | 5/2006 | Schultz | 296/214 |

FOREIGN PATENT DOCUMENTS

EP   1288038 A2   3/2003

* cited by examiner

*Primary Examiner*—Jason S Morrow

(57) ABSTRACT

A vehicle sun visor comprises a support frame pivotally connected to the vehicle roof. A sun visor panel is chosen from any array of different available sun visor panels having different occupant convenience features. An attachment is provided for removably attaching the chosen sun visor panel onto the support frame and enables subsequent removal of that chosen sun visor panel from the support and then the attachment to the support frame of a different chosen sun visor panel having different convenience feature content.

13 Claims, 4 Drawing Sheets

RECONFIGURABLE SUN VISOR

FIELD OF THE INVENTION

The present invention relates to a sun visor for a motor vehicle and more particularly a sun visor having storage and convenience features therein, such as a vanity mirror, mesh storage pocket, pencil holder, and/or a light.

BACKGROUND OF THE INVENTION

It is known to provide a sun visor that is pivotally mounted on the vehicle roof forward of the occupant seat to shade the eyes of the vehicle occupant.

It is also known to mount various occupant convenience features on the sun visor, such as a storage pocket, a pencil holder, a translucent eye shield, a light, etc.

It would be desirable to provide a sun visor in which the vehicle occupant has the option to readily configure and reconfigure the vehicle sun visor to provide a desired combination of occupant convenience features.

SUMMARY OF THE INVENTION

A vehicle sun visor comprises a support frame pivotally connected to the vehicle roof. A sun visor panel is chosen from an array of different available sun visor panels having different occupant convenience features. An attachment is provided for removably attaching the chosen sun visor panel onto the support frame and enables subsequent removal of that chosen sun visor panel from the support frame and then the attachment to the support frame of a different chosen sun visor panel having different convenience feature content.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of the certain exemplary embodiments is merely exemplary in nature and is in no way intended to limit the invention, its application, or uses.

Figure 1:
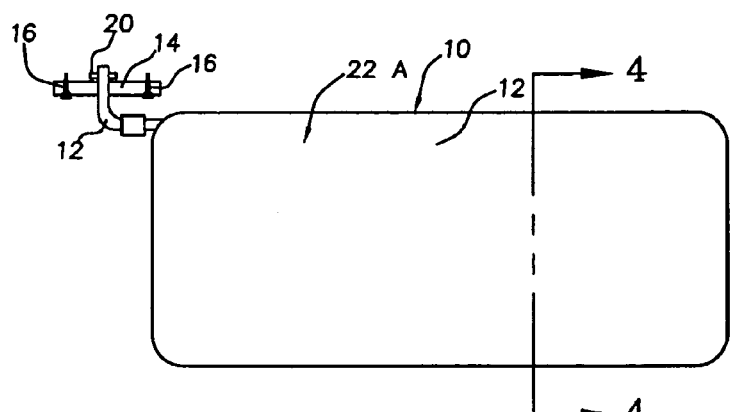
FIG. 1 shows a sun visor assembly for mounting in a motor vehicle and having a sun visor panel that shades the occupant's eyes but does not contain additional occupant convenience features.

Referring to FIG. 1, a vehicle sun visor assembly is shown generally at 10 and includes a support rod 12 that will be attached to a vehicle roof by a mounting bracket 14 and screws 16. A retainer 20 pivotally attaches the support rod 12 to the bracket 14 so that the sun visor assembly 10 may swing about a vertical axis for deployment across the vehicle windshield or across the vehicle side window. The sun visor assembly 10 includes a sun visor panel 22A that is sized to adequately shade the occupant's eyes and yet permit the occupant to view the highway beneath the lower margin of the sun visor panel 22A.

Figure 2:
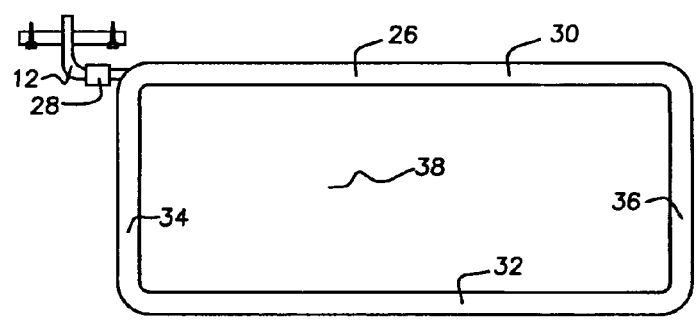
FIG. 2 shows a support frame that is pivotally mounted on the vehicle roof for receiving a sun visor panel.
Figure 3:
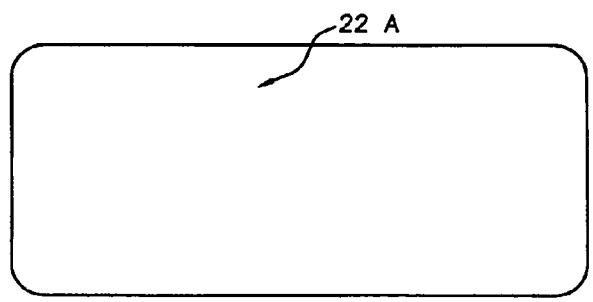
FIG. 3 shows a sun visor panel for attachment onto the support frame of FIG. 2 to thereby provide a sun visor assembly of FIG. 1.

Referring to FIG. 2, it is seen that the support rod 12 is attached to a rectangular support frame 26 by a pivot bearing 28 that will permit support frame 26 to swing about a horizontal axis between a vertical position for shading the occupant's eyes, and a horizontal position stored flat against the vehicle roof. It is seen that the support frame 26 is constructed of a round rod or tube material and includes an upper rod 30 and a lower rod 32 that are spaced apart by end rods 34 and 36 to thereby define a skeletal rectangular frame having a large open central area 38.

Referring to FIG. 2, it is seen that the sun visor panel 22A is preferably of molded plastic construction and is sized to overlie the dimensions of the rectangular support frame 26.

Figure 4:
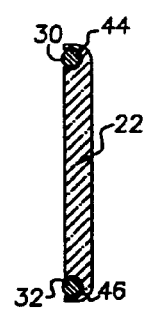
FIG. 4 is a section view taken in the direction of arrows 4-4 of FIG. 1.

As best seen in FIG. 4, the sun visor panel 22A has at its top margin an integrally molded recess 44 by which the sun visor panel 22A may be snap attached onto the upper rod 30 of the support frame 26. FIG. 4 also shows that the lower margin of the panel 22A has an integrally molded recess 46 by which the sun visor panel 22A will snap attach onto the lower rod 32 of the support frame 26. The cooperation between these recesses 44 and 46 of the sun visor panel 22A and the rods 30 and 32 of the support frame 26 is such that the sun visor panel 22A can be removed from the support frame 26 if desired by the vehicle occupant. If desired, similar recesses may be provided to snap onto the end rods 34 and 36.

Figure 5:
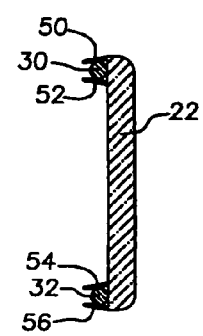
FIG. 5 is a section view similar to FIG. 4 but showing an alternative attachment design for attaching the sun visor panel to the support frame of FIG. 2.

FIG. 5 shows an alternate design of a sun shade panel 22A in which at its top margin a pair of integrally molded legs 50 and 52 are provided to snap attach over the upper rod 30. Likewise at the lower margin of the sun visor panel 22A integrally molded legs 54 and 56 are provided to snap attach onto the lower rod 32 of the support frame 26.

Figure 6:
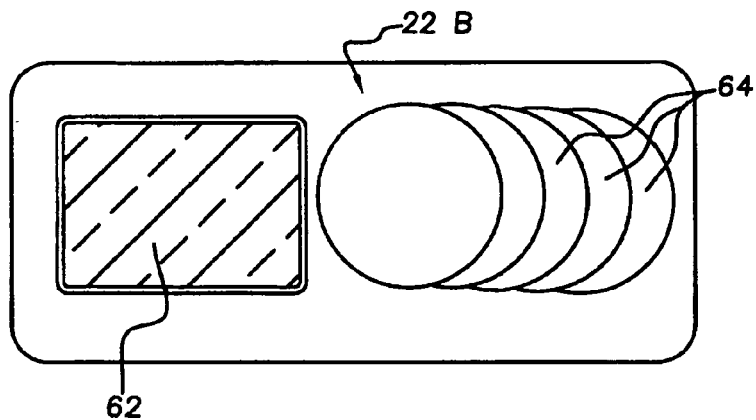
FIG. 6 shows a alternative sun visor panel having thereon a vanity mirror and a compact disk storage feature.
Figure 7:
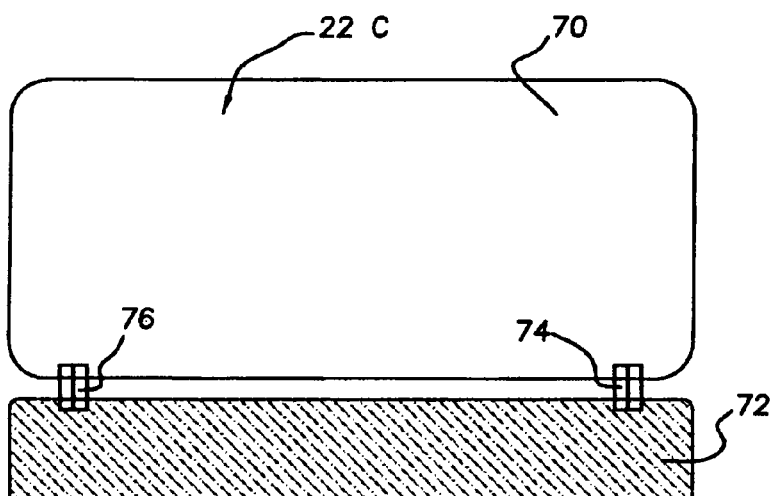
FIG. 7 shows an alternative sun visor panel having an auxiliary translucent eye shade pivotally connected thereto.
Figure 8:
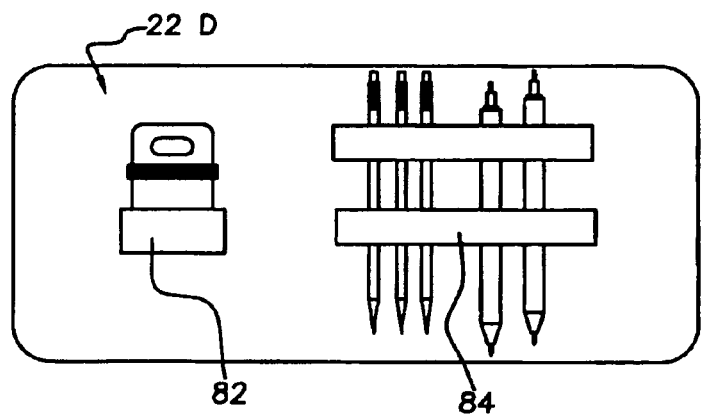
FIG. 8 is an alternate sun visor panel having a pencil holder and a note pad holder.

Referring now to FIGS. 6, 7, and 8, there are shown alternate sun visor panels 22B, 22C and 22D that can be chosen by the vehicle occupant and readily snap attached onto the support frame 26 of FIG. 2 in order to reconfigure this sun visor to provide convenience features as desired by the vehicle occupant.

In particular FIG. 6 shows a sun visor panel 22B having a visor vanity mirror 62 and also having thereon elastic storage pockets 64 for retaining compact discs.

FIG. 7 shows an alternate sun visor panel 22C having appended to the bottom thereof a translucent sun shade panel 72 connected by pivots 74 and 76 by which the translucent panel 72 may be deployed to the lowered position of FIG. 7 for shading the occupants eyes, or pivoted upwardly to overlie the sun visor panel 22C for storage thereon.

FIG. 8 shows a sun visor panel 22D having a notepad holder 82 and a pencil holder 84.

It will be understood that each of the sun visor panels 22A, 22B, 22C, and 22D have a snap attachment, similar to those of FIG. 4 or FIG. 5. Accordingly, the vehicle occupant may conveniently remove a particular sun visor panel and replace it with a different sun visor panel in order to reconfigure the sun visor for the convenience of the vehicle occupant.

Figure 9:
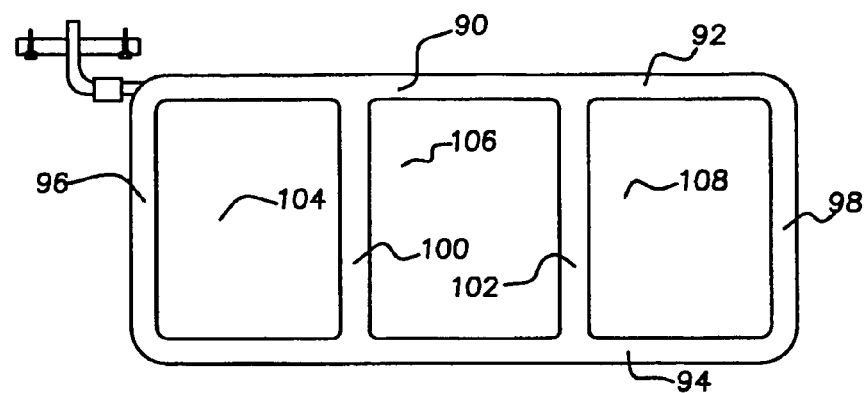
FIG. 9 shows a support frame similar to FIG. 2 but having vertical bars that divide the support frame into three separate rectangular frames.

Referring to FIG. 9, an alternate support frame 90 is provided that includes an upper rod 92, a lower rod 94, and laterally spaced end rods 96 and 98. In addition, however, the support frame 90 includes intermediate vertical rods 100 and 102 by which the support frame 90 is divided into rectangular openings 104, 106 and 108.

Figure 10:
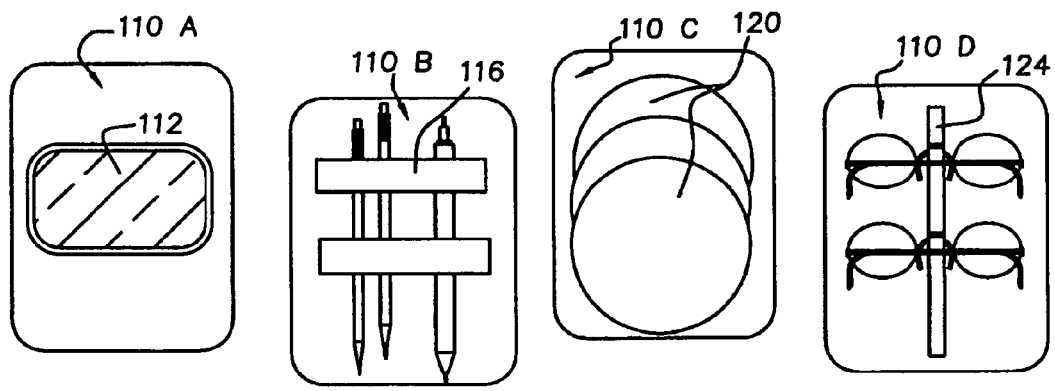
FIG. 10 shows four alternate sun visor panels available for snap attachment onto the support frame of FIG. 9.

Referring to FIG. 10, four separate examples of sun visor panel portions are shown that can be selected and arranged or rearranged in various combinations on the support frame 90 of FIG. 9. In particular, FIG. 10 shows a sun visor panel portion 110A having a visor vanity mirror of 112. A sun visor panel portion 110B has a pencil holder 116. A sun visor panel portion 110C includes elastic storage pockets 120 for retaining compact disks. A sun visor panel portion 110D has a sunglasses retainer 124. Each of these sun visor panel portions is of lesser dimension than the size of the support frame 90 so that three of these panel portions must be installed in order to shade the eyes of the occupant.

It will be understood and appreciated that each of the sun visor panel portions 110A, 110B, 110C, and 110 D has thereon integral snap attachments by which the selected ones of the sun visor panel portions may be readily snap attached onto the frame 90 of FIG. 9. Likewise, the snap attachments permit the ready removal of the chosen sun visor panel portion to permit a different chosen sun visor panel portion to be installed onto the support frame.

Figure 11:
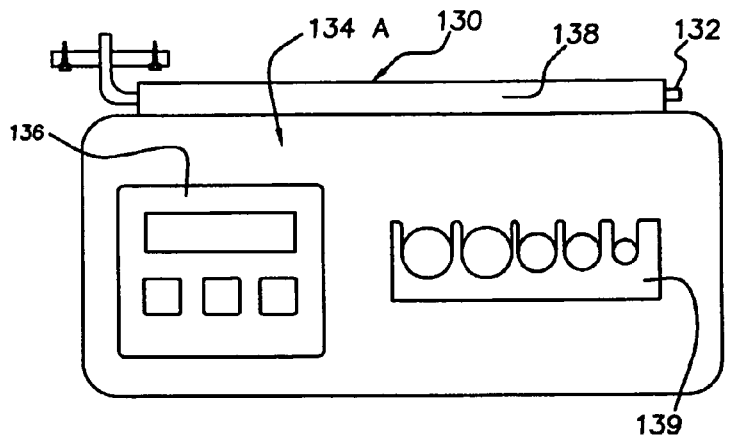
FIG. 11 shows a sun visor assembly having a support frame for attachment to the vehicle roof and a sun visor panel having a garage door opener and a coin holder thereon.

Referring to FIG. 11, an alternate sun visor assembly 130 is provided which includes a support frame 132 and a sun visor panel 134A. The sun visor panel 134A has a garage door opener 136 and a coin holder 139 mounted thereon.

Figure 12:
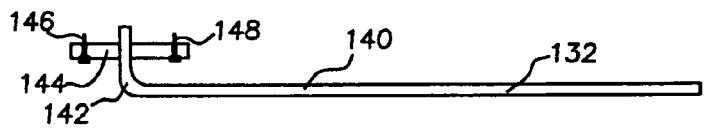
FIG. 12 shows the support frame of the sun visor assembly of FIG. 11.

Referring to FIG. 12, it is seen that the support frame 132 of the sun visor 130 is a metal rod or tube 140 having its end bent upwardly to provide a rod portion 142 pivotally mounted within a mounting bracket 144. The mounting bracket 144 is retained to the vehicle roof by screws 146 and 148.

It will be understood and appreciated that the sun visor panel 134A of FIG. 11 has a mounting sleeve 138 provided at the top margin thereof which slides over the support rod 140 of the support frame 132 to pivotally mount the sun visor panel 134A for pivotal movement to either a vertical position for shading the occupant's eyes or a horizontal position stored against the vehicle roof. A detent, not shown, is preferably provided between the mounting sleeve 138 and the rod 132 to detent the sun visor assembly in either the vertical or horizontal position.

Figure 13:
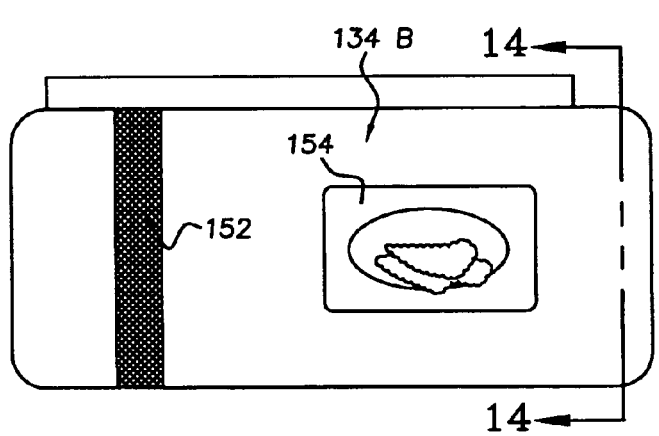
FIG. 13 shows an alternative sun visor panel for installation on the support frame of FIG. 12 and having an elastic band for retaining a map or other articles, and also a tissue box.
Figure 14:
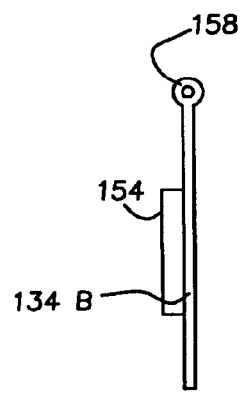
FIG. 14 is a section view taken in the direction of arrows 14-14 of FIG. 13.

Referring to FIG. 13, an alternate sunshade panel 134B is provided and includes an elastic band 152 for holding a map and a tissue box holder 144. Sun visor panel 140 is best shown in FIG. 14 and has a mounting sleeve 158 at the upper margin for sliding onto the support rod 140 of the support frame 132.

It will be understood and appreciated that the sun visor panels 134A and 134B shown respectively in FIGS. 11 and 13 are just two examples of the alternatively equipped sun visor panels from which the vehicle occupant can choose a desired combination of convenience features. Whenever desired, the vehicle occupant can readily remove a particular sun visor panel and reinstall a differently configured sun visor panel to obtain the desired occupant convenience, features.

The foregoing description of the invention is merely exemplary in nature and, thus, variations thereof are well within the ordinary skill of the art and intended to be within the scope of the invention. For example, the support frame could be of molded plastic, a metal stamping, bent wire rod or tube, or otherwise constructed using known manufacturing processes. Although the sun visor frame shown herein is rectangular, it is well known that sun visors have some variation in shape and may be trapezoidal or the like, for example, to fit around a rear view mirror, and therefore the term "generally rectangular" as used herein is intended to refer to these common sun visor shapes. It is well known in the manufacture of sunshade assemblies that the sunshade panel may be constructed of injected molded plastic, or the sunshade panel may have a cardboard or plastic core that is then covered with a vinyl or cloth material. The present invention contemplates that the sun visor panel can be manufactured using any of the available technologies. In addition, the snap attachment features are not limited to those examples shown herein, and other attachment designs available in the industry may be employed in the practice of the invention. It will be understood that the particular convenience features shown herein are merely examples of some of the various convenience features that are available in the prior art and could be made available in the marketplace to facilitate the practice of the invention.

What is claimed is:

1. A vehicle sun visor assembly comprising:
   a support frame connected to the vehicle, said frame being of not sufficient dimension to shade the eyes of an occupant;
   a sun visor panel including at least two sun visor portions chosen from an array of different sun visor panel portions having different content, said sun visor panel being of sufficient dimension to shade the eyes of an occupant;
   and an attachment for removably and independently attaching the chosen sun visor panel portions onto the support frame adjacent one another and enabling subsequent removal of one or both of the chosen sun visor panel portions from the support frame and then the attachment to the support frame of a different chosen sun visor panel portion having different content.

2. The vehicle sun visor assembly of claim 1 in which the support frame is a skeletal member.

3. The vehicle sun visor assembly of claim 1 in which the sun visor panel is opaque and of length and width sufficient to shade the eyes of the vehicle occupant, and the attachment for removably attaching the chosen sun visor panel portions to the support frame is carried by the sun visor panel portions.

4. The vehicle sun visor assembly of claim 3 in which the sun visor panel portions have occupant convenience content such as one or more of a vanity mirror, a map storage pocket, a pencil holder, a translucent eye shield, a note pad holder, a compact disc storage pocket, a garage door opener, a coin holder and a comb holder.

5. The vehicle sun visor assembly of claim 1 in which the support frame is a generally rectangular skeletal shape.

6. The vehicle sun visor assembly of claim 5 in which the sun visor panel portions are of molded construction and have molded in place integral attachments for removable attachment onto the support frame.

7. The vehicle sun visor assembly of claim 1 in which the support frame is a rod and the sun visor panel has a sleeve that slides over the rod to removably attach the sun visor panel.

8. A vehicle sun visor assembly comprising:
   an array of generally planar sun visor panels of molded construction that differ from one another by having various storage and convenience features incorporated therein;
   a support frame adapted for pivotal connection to the vehicle roof to permit swinging movement of the support frame from a position extending parallel to a vehicle windshield to a position extending parallel to a vehicle side window, said support frame being of not sufficient dimension to shield the eyes of an occupant and including laterally spaced inboard and outboard rods connected with longitudinal spaced upper and lower rods so that the support has a central opening;
   and releasable attachment means including integrally molded snap attachment features that snap onto the rods of the support frame to effect a releasable attachment between the support frame and a selected one of an array of sun visor panels so that any selected one of the array of sun visor panels having various storage and convenience features may be selectively attached and removed and replaced as desired.

9. The sun visor assembly of claim 8 in which the array of generally planar sun visor panels have attachment devices thereon for releasable attachment to at least two of the rods of the support frame.

10. The sun visor assembly of claim 8 in which the sun visor is comprised of two or more sun visor portions that attach side by side on the support frame and each of the sun visor portions has different convenience features.

11. A vehicle sun visor assembly comprising:
    a support frame adapted for attachment to a vehicle roof and being not sufficient to substantially shade the eyes of a vehicle occupant;
    and an array of available interchangeable sun visor panels adapted to be chosen by the vehicle occupant and readily attached to the support frame, each of the array of available sun visor panels being of a material effective to shade the eyes of the vehicle occupant and each being of a dimension lesser than the dimension of the frame so that two or more of the array of available interchangeable sun visor panels when attached onto the support frame adjacent one another cover the frame and shade the eyes of the occupant, and each of the available sun visor panels having different occupant convenience features thereon.

12. The sun visor assembly of claim 11 in which the support fame is a skeletal frame having a substantial opening therein and the array of available sun visor panels each have thereon attachment features that attach to the skeletal frame and permit ready disattachment of a sun visor panel and its replacement by a different one of the array of available sun visor panels having different occupant convenience features thereon.

13. The sun visor assembly of claim 11 in which the support frame is a rod and the each of the array of sun visor panels has a sleeve thereon adapted to slide over the rod whereby a chosen one of the array of available sun visor panels may be readily attached by sliding the sleeve over the rod and readily disattached by unsliding the sleeve from the rod.

* * * * *